United States Patent
Xu et al.

(10) Patent No.: US 6,195,045 B1
(45) Date of Patent: *Feb. 27, 2001

(54) ADAPTIVE ANTENNA ARRAY SYSTEM CALIBRATION

(75) Inventors: Guanghan Xu; Daniel Wee; Ying Chen; Yong Rao, all of Austin, TX (US)

(73) Assignee: Cwill Telecommunication, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/570,160

(22) Filed: May 11, 2000

Related U.S. Application Data

(63) Continuation of application No. 09/239,896, filed on Jan. 29, 1999, now Pat. No. 6,124,824.

(51) Int. Cl.[7] .................. G01S 7/40; H04Q 3/26
(52) U.S. Cl. .................. 342/368; 342/174
(58) Field of Search .................. 342/174, 368, 342/360; 375/206

(56) References Cited

U.S. PATENT DOCUMENTS

| 5,546,090 | 8/1996 | Roy, III et al. . |
| 5,809,063 | 9/1998 | Ashe et al. . |

Primary Examiner—Mark Hellner
(74) Attorney, Agent, or Firm—Conley, Rose & Tayon P.C.

(57) ABSTRACT

A code division multiple access time division duplex communication system having an adaptive antenna array station communicates beamformed orthogonal code channels to a remote station. The remote station determines the amplitude and phase components of the received code channels and communicates the information back to the adaptive antenna array station which uses the information plus the beamform of the received signal in an adaptive antenna array station calibration process. By varying one of the beamforms received by the remote station, sufficient data points may be gathered to facilitate accurate calibration. The calibration procedure may be performed while voice or other digital information is communicated between the remote station and the adaptive antenna array station.

25 Claims, 3 Drawing Sheets

FIG. 2
| CODE CHANNEL | OUTBOUND | INBOUND |
|---|---|---|
| 0 | ACCESS, OMNI DIRECTIONAL | ACCESS |
| 1 | VOICE, BEAMFORMED | VOICE |
| ⋮ | ⋮ | ⋮ |
| 31 | VOICE, BEAMFORMED | VOICE |
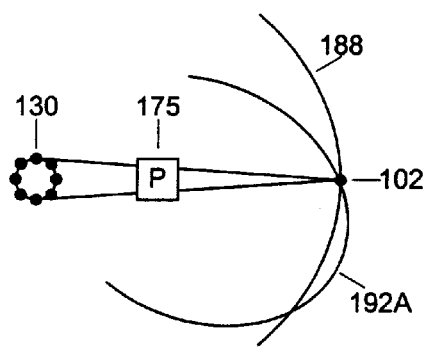
FIG. 3A
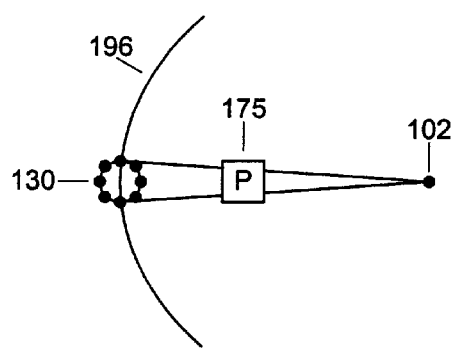
FIG. 3B
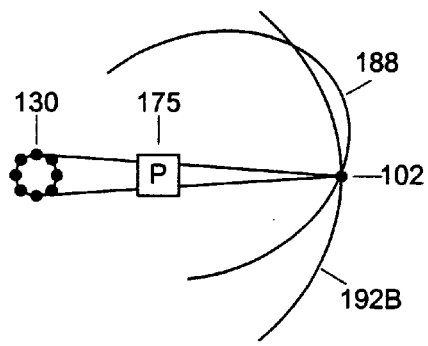
FIG. 3C
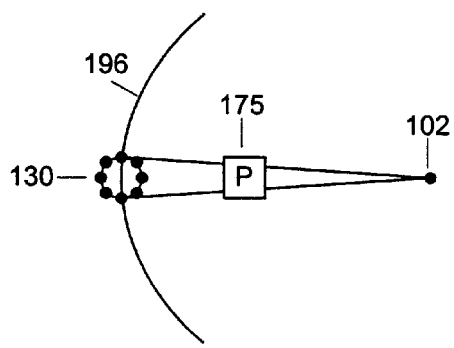
FIG. 3D

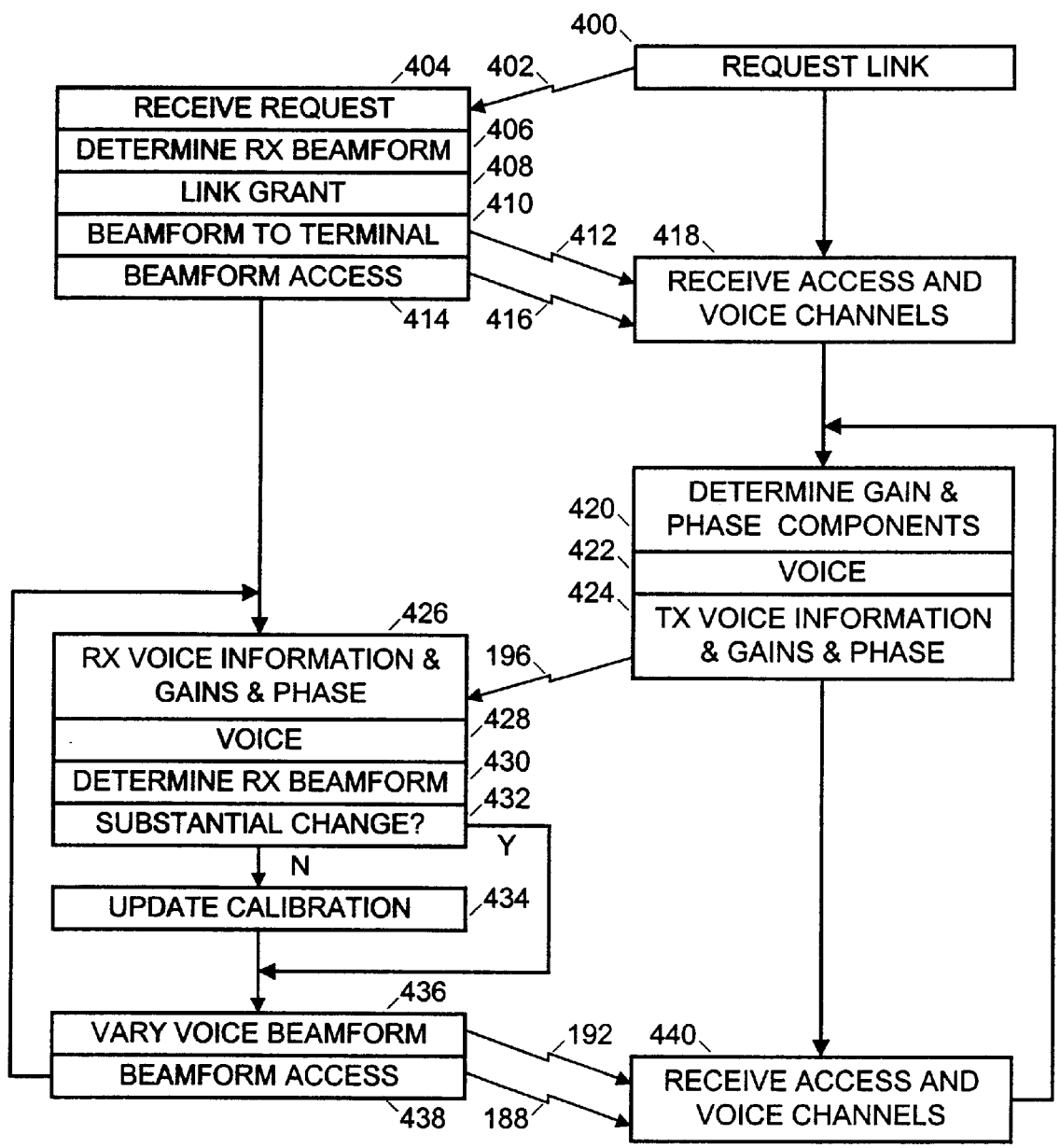

ADAPTIVE ANTENNA ARRAY SYSTEM CALIBRATION

This is a continuation of application Ser. No. 09/239,896 filed Jan. 29, 1999, titled Adaptive Antenna Array System Calibration whose inventors are Guanghan Xu, Daniel Wee, Ying Chen and Yong Rao now U.S. Patent No. 6,124,824.

FIELD OF THE INVENTION

This invention relates in general to wireless communication systems having adaptive antenna arrays and more particularly to the calibration of adaptive antenna array stations of said communication systems.

BACKGROUND OF THE INVENTION

Smart antennas, or adaptive antenna arrays are proving to have a distinct advantage in modern wireless communication systems. The array is capable of beamforming or directing a beam of radiated energy toward a desired receiver. This has the advantage of increasing the power available to the desired receiver. In code division multiple access (CDMA) systems this has proven even more advantageous because the interference received by another receiver in an adjacent area is significantly reduced relative to conventional omni-directional or sectored transmissions.

The beamforming process is simplified in a time division duplex (TDD) system because the communications to and from an adaptive antenna array occur on a common frequency albeit during different time slots. This enables the adaptive antenna to create a transmit beam pattern substantially equal to a beam pattern received by the antenna array. As opposed to a frequency division duplex (FDD) system where transmissions and receptions occur on different frequencies, having different propagation paths, the beamform of a TDD system is more accurately formed because the transmit and receive propagation characteristics are substantially the same.

An adaptive antenna array uses a multitude of transmitters and receivers, each coupled to a corresponding element of the antenna array. The received beamform is determined by measuring the power and phase of a desired signal received on each antenna element and its corresponding receiver. The transmit beam is formed by varying the phase and power of each signal transmitted by the multitude of transmitters and corresponding antenna elements.

In order to accurately form a desired beam, the amplitude and phase of each component of the adaptive array subsystem should be known to a reasonable degree of precision. Uncompensated differences in the gain and phase in the adaptive antenna array subsystem degrades the performance of the subsystem. Ideally the gain and phase characteristics are predetermined at the time of manufacture and are environmentally invariant. However, in reality these characteristics vary over time, in response to the environment and in response to servicing and replacement of components of the adaptive antenna array subsystem. Thus, what is needed is an apparatus for determining variations in gain and phase of components of an adaptive array subsystem and for producing a calibration signal in response thereto.

OBJECTS OF THE INVENTION

It is therefor an object of the invention to provide for the aforementioned need. Further objects are realized by the claims presented herein.

BRIEF DESCRIPTION OF THE DRAWINGS

FIG. 2 shows frame structure of time division duplex inbound and outbound signals of the adaptive antenna array station.

FIG. 3A to FIG. 3D show communication beamforms between the adaptive antenna array station and a remote station.

FIG. 4 shows a flow diagram of the processes used in the adaptive antenna array station and the remote station in accordance with the present invention.

DETAILED DESCRIPTION OF THE INVENTION

Figure 1:
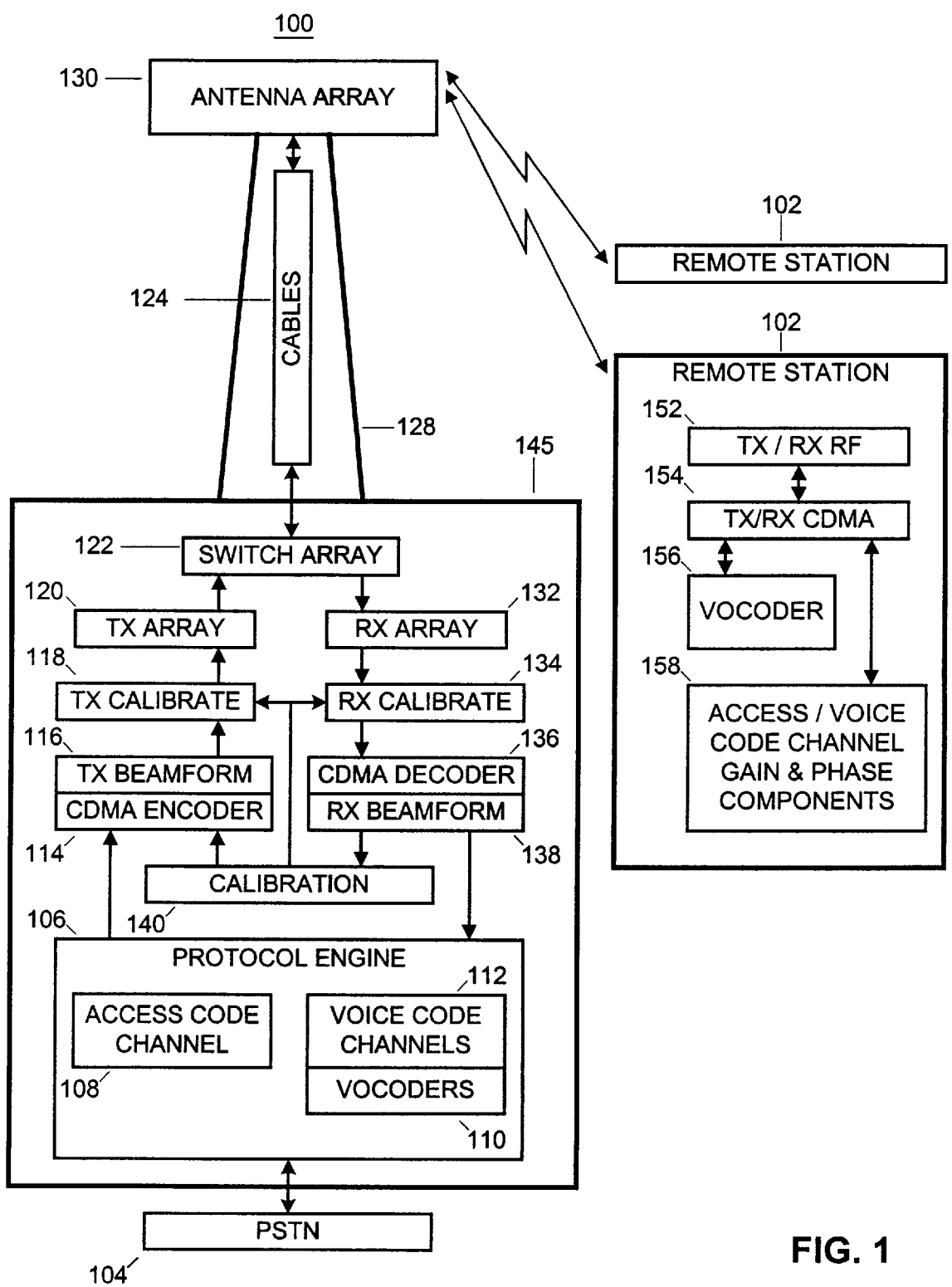
FIG. 1 shows an adaptive array antenna station in communication with remote stations and a telephone network.

FIG. 1 shows an adaptive array antenna station in communication with remote stations and a telephone network. Adaptive antenna array subsystem 100 is in wireless communication with remote stations 102 and the public switched telephone network (PSTN) 104. In the preferred embodiment station 100 is a wireless local loop base station which facilitates telephone communication between the remote terminals 102 and the PTSN 104 using a synchronous CDMA (SCDMA) TDD communication system. Such a system is described in co-pending U.S. patent application Ser. Nos. 08/908,914 and 08/768,100 which are hereby incorporated by reference. Note that a remote station 102 may itself include an adaptive antenna array or an omni-directional antenna.

The PSTN 104 is coupled to protocol engine 106 which converts between PSTN communications signals and SCDMA TDD communication signals. An access channel processor 108 processes outbound access channel signals for synchronizing remote stations and for granting and terminating voice channels. Vocoders 110 convert between PSTN signals and digital signals for communication on one of the preferably up to thirty one voice channels processed by voice channel processor 112. Outbound signals from protocol engine 106 are applied to CDMA encoder 114 which preferably modulates the outbound signals on any of the up to thirty two orthogonal CDMA channels. Thereafter, beamformer 116 adjusts the gain and phase of each code channel for each of element of the antenna array 130 to create the desired beamform for the code channel. The gain and phase of the signals for each antenna element is then compensated by transmit outbound signal calibrator 118 to compensate for variations within the arrays of station 100. The signals are then amplified by transit array 120, and provided to antenna array 130 through transmit / receive switch array 122 and cables 124.

Inbound signals received from station 102 are received by antenna array 130 and pass to receiver array 132 through cables 124 and switch array 122. Switch array 122 switches the antenna array between the transmitter array and the receiver array in accordance with the time division duplex mode of operation of the preferred embodiment of the present invention. Received signals from receiver array 134 are processed by CDMA decoder 136 and inbound signal beamformer 138 to recover information communicated from stations 102. The information is then processed by voice channel processor 112 and vocoder 110 of protocol engine 106 for communication with the PSTN. In the preferred embodiment antenna array 130 has eight antenna elements. Correspondingly, cables 124 comprise eight cables, transmit array 120 has eight transmitters and receive array 134 has eight receivers.

In a typical application, station 100 has antenna array 130 mounted atop a building or tower 128 or other advantageous position while components 108 to 140 are mounted in a housing 145 typically within an environmentally controlled interior space, and coupled to each other by transmission line cables 124. It should be appreciated that repair or replacement of a transmitter or receiver component 120 and 132 or replacement of a cable 124 or other servicing of the station 100 introduces changes which modify the gain and phase characteristics of the smart antenna system. Also, changes in the environment or aging can modify the gain and phase characteristics of the subsystem.

Calibrator 140 processes information received on the voice channel from a remote station 102 as well as receiving beamform information from beamformer 138 to adjust the transmit and receive calibration functions 118 and 134. It should be noted that inbound receive beamformer 138 need not determine a direction of arrival of each code channel, rather a spatial signature associated with a terminal used in the calibration procedure is sufficient.

Station 102 contains a transceiver 152 for communicating with station 100. Signals are processed by transmit / receive CDMA processor for encoding and decoding voice and other information from received signals. Vocoder 152 converts between digital information for communication with station 100 and voice and / or data signals provided by station 102 to a user or machine associated with terminal 102. Terminal 102 also facilitates calibrator 140 with access and code channel amplitude and phase component determining device 158. This device processes the signal from the CDMA decoder to determine components of the amplitude and phase of the access and voice channels. Preferably, the relative amplitude and relative phase between the channels is determined by comparison of the amplitude and phase timing of the access and voice code channels received by station 102. Alternately, the components of the amplitude and phase may comprise an absolute amplitude of the access channel and an absolute amplitude of the voice code channel and/or an absolute phase of the access channel and an absolute phase of the voice code channel as determined by terminal 102. The components of the amplitude and phase information is made available to CDMA encoder 154 for communication with an information signal back to station 100 for use by calibration means 140.

U.S. Pat. No. 5,549,090 to Roy, III et al., Aug. 13, 1996 describes a calibration method for compensating for gain and phase changes within a smart antenna base station, said patent is hereby incorporated by reference. The calibration results in a modification of the amplitude and phase of the transmitted signal and a compensation for gain and phase changes induced during reception. However, the description requires an orthogonal signal to be transmitted by each antenna element and an external reflecting repeater, incapable of facilitating communication between the PSTN 104 and a remote station 102 during a calibration procedure to perform calibration. Furthermore the disclosure is optimized towards FDD adaptive antenna array systems.

FIG. 2 shows frame structure of time division duplex inbound and outbound signals of the adaptive antenna array station. In the preferred embodiment, the station handles thirty two independently identifiable orthogonal CDMA channels. Code channel "0" is reserved for the access channel. In the outbound mode the beamform of the access channel is substantially omni-directional, although the access channel may be shaped to account for locations of remote stations 102. The remaining thirty one code channels are for communication of information between station 100 and remote stations. During outbound traffic, the channels are beamformed to maximize reception by an intended remote station while minimizing interference of the code channel with other remote stations located in different areas. The inbound portion of the frame is used to receive information, including voice and data traffic, from the remote stations and to determine spatial signatures associated with the remote stations.

FIG. 3A to FIG. 3D show communication beamforms between the adaptive antenna array station and a remote station. The adaptive antenna array station transmits individually identifiable outbound signals 188 and 192 and receives an inbound signal 196. Each antenna element of adaptive antenna array 130 has a gain and phase propagation characteristic "P" 175 with an antenna associated with remote station 102. Thus P represents a complex eight element vector. In FIG. 3A the adaptive antenna array produces a substantially omni-directional or predetermined beamform for the access channel 188. The voice code channel is uniquely beamformed 192A for reception by the remote station 102. Remote station 102 determines the amplitude and phase components of the access and voice channels and in FIG. 3B communicates the information to antenna array 130 with beamform 196. Station 100 processes the inbound beamform and amplitude and phase component information and in FIG. 3C the adaptive antenna array again produces a substantially omni-directional beamform for the access channel 188 while the beamform 192B for voice code channel varied from beamform 192A of FIG. 3A. Note that the variation is caused substantially by processes in calibrator 140 rather than variations in inbound spatial signatures due to inbound beamform 196. The calibrator may vary the beamform in response to random inputs or in accordance with a predetermined sequence and / or in response to the amplitude and phase component information signal returned from the remote station. Remote station 102 again determines the amplitude and phase components of the access and voice channels and in FIG. 3D communicates the information to antenna array 130 with beamform 196. As will be explained below, station 100 utilizes the information to calibrate the adaptive antenna array system.

FIG. 4 shows a flow diagram of the processes used in the adaptive antenna array station and the remote station in accordance with the present invention. The process begins with the remote station making a link request at step 400 with signal 402. The adaptive antenna array station receives the link request at step 404, determines an initial beamform or spatial signature associated with the remote station at step 406, and determines a code channel for communication in order to grant the link at step 410. Then a beamform for the remote terminal is generated at step 412 in response to step 406 and the omni-directional access channel is beamformed at step 414. The beamformed voice channel signal 412 and omni-directional access channel signal 416 are received by the remote station at step 418. Step 420 determines the amplitude and phase components of the access and voice signals. Voice I/O is preformed at step 422 for communication between the remote terminal and its user. In step 424, voice (or data) information from the user as well as amplitude and phase component information from step 420 are communicated to the adaptive antenna array station via signal 196. Signal 196 is received by the adaptive antenna array station at step 426 and voice (or data) information is exchanged with the PSTN at step 428. Step 480 determines the beamform or spatial signature of the inbound signal 196. If there is a substantial change, then the characteristics of the wireless communication channel 175 of FIG. 3 has changed and the calibration process 434 is avoided. If there is no substantial change at step 432 then the calibration is updated as will be explained below. Thereafter step 436 varies the beamform of the outbound voice signal 192 and step 438 beamforms the substantially omni-directional access channel signal 188. Signals 192 and 188 are received by remote station at step 440 which again returns to step 420 to determine the amplitude and phase components of signals 192 and 188.

The process of calibration updating may be performed periodically or continuously between a remote terminal in communication with an adaptive antenna array station. If at step 432, it is determined that the channel associated with a particular remote terminal is not stable enough for calibration, the adaptive antenna array station may choose a different remote station to continue the calibration process. Thus the system has the advantage of not only eliminating a requirement of a separate "repeater" remote station for calibration, but also has the robust advantage of being able to use any remote station or a combination of remote stations in order to perform calibration.

While the system is described as performing calibration while the user of the remote station is in communication with the PSTN, it should be appreciated that communication of a predetermined signals having known characteristics between the adaptive antenna array station and the remote station could further facilitate the calibration process.

In the preferred embodiment, the calibration process works as follows. Calibration of the present invention is performed without the knowledge or with partial knowledge of t and r, where $t=[t(1), t(2), \ldots, t(m)]$ is a 1xm transmit calibration vector and $r=[r(1), r(2), \ldots, r(m)]$ is a 1xm receive calibration vector and m is the number of antenna elements in the antenna array. The calibration process finds the ratio between the corresponding elements of t(i) and r(i), or, $c(i)=t(i)/r(i)$.

After establishing a link between the terminal and base station, the terminal transmits a normal traffic signal to the base station. The base station receives the signal from multiple antenna elements and receiver channels and estimates the receive beamform vector br, where $br(i)=a(i)*r(i)$ or $a(i)=br(i)/r(i)$, where $a=[a(1), a(2), \ldots, a(m)]$ is a spatial signature vector whose i-th element specifies the gain or attenuation and phase of the electromagnetic path from the terminal to the i-th antenna. Two individually identifiable beamforms $w_1=[w_1(1), w_1(2), \ldots, w_1(m)]$ and $w_2=[w_2(1), w_2(2), \ldots, w_2(m)]$ of two orthogonal synchronous code-division-multiple-access (CDMA) signals spread on two orthogonal code channels are transmitted. One signal is the access signal, while another is the traffic signal. The terminal demodulates these two signals, decodes the information symbols, and calculates amplitude and phase components, preferably the amplitude and phase difference between these two signals. Mathematically, denote such an amplitude and phase difference as a complex number such that, $p=\Sigma w_1(i)*t(i)*a(i)/\Sigma w_2(i)*t(i)*a(i)$ or $\Sigma w_1(i)*t(i)*a(i)=\Sigma p*w_2(i)*t(i)*a(i)$. Since $a(i)=br(i)/r(i)$, $\Sigma w_1(i)*t(i)*br(i)/r(i)=\Sigma p*w_2(i)*t(i)*br(i)/r(i)$. Because $c(i)=t(i)/r(i)$, consequently, $\Sigma w_1(i)*br(i)*c(i)=\Sigma p*w_2(i)*br(i)*c(i)$ or $\Sigma(w_1(i)*br(i)-p*w_2(i)*br(i))*c(i)=0$, wherein the "$\Sigma$" symbol represents the sum from i=1 to m. Since $w_1$, $w_2$ and br are known and p is fed back to the base station from the terminal, there is one equation for $c(1), \ldots, c(8)$. Since the absolute phase of the c vector may be ignored, without loss of generality, set $c(1)=1$ to avoid the trivial solution of c being all zeros. With another different set of $w_1$ and $w_2$, we have another equation of the unknowns. The above variable beamforming process is repeated a plurality of times, preferably for at least m−1 times to create m−1 equations to uniquely find $c(2), \ldots, c(m)$. For the same terminal, br is the same. Furthermore, the above calibration procedure can be performed by communication with another spatially separate terminal to have a different br, thereby generating more equations than unknowns. A number of different techniques such as least squares (LS) and total least squares (TLS) and singular value decomposition (SVD) can be applied to find an estimate of c from the over-determined equations.

In the preferred procedure, knowledge of the t and r is not required. However, the knowledge of them can help determine the $w_1$, and $w_2$ such that the signal strengths of both transmit signals are comparable to increase the accuracy of the estimation of p. For the same accuracy reason, we can also determine whether we want to include an equation by judging the variation of the br vector over a certain time window. To add more weights on those p results that are more likely to be accurate, we can weigh each equation by a certain factor determined by the signal-to-noise ratios (SNRs) of both signals received by the terminal. In this way, the equation with smaller weight will be weighed less in the overall estimation of the c vector to improve the estimation accuracy. To simplify the calibration procedure, the two outbound signal symbols on the access and traffic channels may be exactly the same to avoid the decoding scheme in the calibration mode.

Furthermore, a validity check of external calibration may be triggered by comparing the determined amplitude components with a predetermined value or value range. After the calibration step is completed, the new calibration results are used to calculate the p value based on the following formula, $$P1=\Sigma w_2(i)*br(i)*c(i)/\Sigma w_1(i)*br(i)*c(i),$$

wherein the "$\Sigma$" symbol represents the sum from i=1 to m and where the $w_1$, is the substantially omni-directional beamform vector and $w_2$ is a beamform for normal voice communications with the terminal. In a normal voice call, the value p is also fed back from the terminal and compared with the predicated value p1. If their difference is within a predetermined threshold, the external calibration is considered completed correctly. This criterion can also be used to trigger an external calibration procedure during normal operations. In implementation, the calibrator 140 would further determine the calibration result in response to the information signal having an amplitude or phase component beyond a predetermined threshold. If the amplitude or phase component were within the predetermined threshold, the system would be in calibration and the calibration result need not be determined again.

The calibration of this invention as described herein is not limited to a base station application of an adaptive antenna array. It is contemplated that this invention may be readily extended to antenna array remote station devices. Furthermore, the calibration of this invention may work in combination with internal calibration methods as either a refinement or independent check on internal calibration. Internal calibration of such an adaptive antenna array has been described in co-pending U.S. patent application Ser. No. 09/179,047 entitled Adaptive Antenna Array Subsystem Calibration filed Oct. 26, 1998 and assigned to the assignee of the present invention, said application is hereby incorporated by reference.

Thus, what has been provided is an apparatus for determining variations in gain and phase of components of an adaptive array system and for producing a calibration signal in response thereto.

We claim:

1. In a wireless communication system, a method of operating an adaptive antenna array at a first station comprising the steps of:

uniquely beamforming and simultaneously transmitting first and second individually identifiable outbound signals for reception by a second station;

receiving inbound signals from the second station;

variable beamforming the second individually identifiable outbound signal wherein said variation is substantially independent of an inbound beamform determinable in response to said step of receiving.

2. The method according to claim 1 further comprising the step of determining the inbound beamform in response to said step of receiving, and wherein said step of uniquely beamforming further establishes an initial beamform for the second individually identifiable signal in response to said step of determining.

3. The method according to claim 1 wherein said step of variable beamforming performs a predetermined variation in beamforming of the second individually identifiable outbound signal.

4. The method according to claim 1 wherein the inbound signals include an information signal indicative of amplitude and phase components of the first and second individually identifiable outbound signals received by the second station and further wherein said step of variable beamforming varies the beamforming of the second individually identifiable outbound signal in response to the information signal.

5. The method according to claim 1 wherein the first and second individually identifiable outbound signals are orthogonal code division multiple access signals transmitted at a common carrier frequency.

6. The method according to claim 1 wherein said step of variable beamforming produces a plurality of outbound beamforms for the second individually identifiable outbound signal and the inbound signal includes a corresponding plurality of information signals indicative of amplitude and phase components of the first and second individually identifiable outbound signals received by the second station for each of the plurality of outbound beamforms and further comprising the steps of:

determining an inbound beamform in response to said step of receiving;

processing the inbound beamform and the plurality of information signals to determine a calibration result for the first station.

7. The method according to claim 6 wherein said step of determining determines a plurality inbound beamforms associated with each of the plurality of outbound beamforms; and said step of processing inhibits processing in response to a substantial dissimilarity between the plurality of inbound beamforms.

8. The method according to claim 6 wherein said step of uniquely beamforming and simultaneously transmitting uniquely beamforms the second individually identifiable outbound signal in response to the calibration result.

9. The method according to claim 6 wherein the communication system further includes a third station wherein said step of uniquely beamforming and simultaneously transmitting further includes the steps of:

uniquely beamforming a third individually identifiable outbound signal intended for reception by the third station in response to the calibration result; and simultaneously transmitting the first and third individually identifiable outbound signals.

10. The method according to claim 6 wherein the first station has a multiplicity of transmitters coupled to a corresponding multiplicity of antenna elements of the antenna array for uniquely beamforming and transmitting the outbound signals wherein each transmitter and its corresponding antenna have a transmit gain and a phase component, the first station further having a multiplicity of receivers coupled to the corresponding multiplicity of antenna elements of the antenna array for receiving the inbound signals wherein each receiver and its corresponding antenna element have a receive gain and phase component, and further wherein the calibration signal compensates for the ratio of the transmit gain and phase component and the receive gain and phase component associated with each antenna element and the corresponding transmitter and receiver.

11. The method according to claim 1 wherein the communication system facilitates communication of information between a first and a second user coupled to the first and second stations respectively and further wherein the inbound signals of said step of receiving includes information for communication from the second user to the first user and the second individually identifiable outbound signal of said step of variable beamforming includes information for communication from the first user to the second user.

12. In a wireless communication system, an adaptive antenna array first station comprising:

an outbound beamformer for uniquely beamforming and simultaneously transmitting first and second individually identifiable outbound signals for reception by a second station;

a receiver for receiving inbound signals from the second station;

a calibrator for variable beamforming the second individually identifiable outbound signal wherein the variation is substantially independent of an inbound beamform determinable in response to inbound signals received by said receiver.

13. The station according to claim 12 further comprising an inbound beamformer for determining the inbound beamform in response to the inbound signals received by said receiver, and wherein said outbound beamformer further establishes an initial beamform for the second identifiable signal in response to said inbound beamformer.

14. The station according to claim 12 wherein said calibrator performs a predetermined variation in beamforming of the second individually identifiable outbound signal.

15. The station according to claim 12 wherein the inbound signals include an information signal indicative of amplitude and phase components of the first and second individually identifiable outbound signals received by the second station and further wherein said calibrator varies the beamforming of the second individually identifiable outbound signal in response to the information signal.

16. The station according to claim 12 wherein the first and second individually identifiable outbound signals are code division multiple access signals transmitted at a common carrier frequency.

17. The station according to claim 12 wherein said calibrator produces a plurality of outbound beamforms and the inbound signal includes a plurality of information signals indicative of amplitude and phase components of the first and second individually identifiable outbound signals received by the second station corresponding to each of the plurality of outbound beamforms, the station further comprising an inbound beamformer for determining an inbound beamform in response to the inbound signals received by said receiver and further wherein said calibrator processes the inbound beamform and the plurality of information signals to determine a calibration result.

18. The station according to claim 17 wherein said inbound beamformer determines a plurality inbound beamforms associated with each of the plurality of outbound beamforms; and said calibrator inhibits processing in response to a substantial dissimilarity between the plurality of inbound beamforms.

19. The station according to claim 17 wherein said outbound beamformer simultaneously and uniquely beamforms the second individually identifiable outbound signal for reception by the second station in response to the calibration result.

20. The station according to claim 17 wherein the communication system further includes a third station and wherein said outbound beamformer uniquely beamforms a third individually identifiable outbound signal intended for reception by the third station in response to the calibration result for simultaneous transmission with the first individually identifiable outbound signal.

21. The station according to claim 17 further comprising:

a multiplicity of transmitters coupled to a corresponding multiplicity of antenna elements of the antenna array for uniquely beamforming and transmitting the outbound beamforms wherein each transmitter and its corresponding antenna have a transmit gain and a phase component; and a multiplicity of receivers coupled to the corresponding multiplicity of antenna elements of the antenna array for receiving the inbound signals wherein each receiver and its corresponding antenna element have a receive gain and phase component, wherein the calibration signal compensates for the ratio of the transmit gain and phase component and the receive gain and phase component associated with each antenna element and the corresponding transmitter and receiver.

22. The station according to claim 17 further wherein said calibrator further determines the calibration result in response to the information signal having an amplitude or phase component beyond a predetermined threshold.

23. The station according to claim 12 wherein the communication system facilitates communication of information between a first and a second user coupled to the first and second stations respectively and further wherein the inbound signals include information for communication from the second user to the first user and the second individually identifiable outbound signal includes information for communication from the first user to the second user.

24. In a wireless communication system, a method of operating a second station receiving a signal from an adaptive antenna array at a first station comprising the steps of:

simultaneously receiving uniquely beamformed first and second individually identifiable signals from the first station;

determining amplitude and phase components of the first and second individually identifiable signals and generating an information signal indicative thereof; and transmitting the information signal to the first station.

25. The method according to claim 24 wherein the communication system facilitates communication of information between a first and a second user coupled to the first and second stations respectively and further wherein the second individually identifiable signal of said step of simultaneously receiving includes information for communication from the first user to the second user and the information signal of said step of transmitting further includes information for communication from the second user to the first user.

* * * * *